United States Patent [19]

Dubreuil et al.

[11] Patent Number: 4,622,741

[45] Date of Patent: Nov. 18, 1986

[54] METHOD OF DEFORMING A CABLE

[75] Inventors: Luc T. Dubreuil, St. Placide; Gaston D. Pouliot, St. Julie; Gerard G. Cote, La Prairie; Réjean Larouche, Dorval; Bretislav P. Zuber, Montreal, all of Canada

[73] Assignee: Northern Telecom Limited, Montreal, Canada

[21] Appl. No.: 731,824

[22] Filed: May 9, 1985

[51] Int. Cl.⁴ ................... H01R 43/00; B21D 37/10
[52] U.S. Cl. ...................................... 29/858; 29/282; 29/516; 72/416
[58] Field of Search .............. 29/516, 559, 700, 728, 29/863, 861, 751, 818, 819, 820, 282, 235, 858; 72/416, 342; 425/407, 384, 392; 264/36, 230, 320; 294/1.1

[56] References Cited

U.S. PATENT DOCUMENTS 3,567,268  3/1971  Peterson ........................... 294/86
3,754,429  8/1973  Creuzet ............................ 72/342
4,091,062  5/1978  Nelson ............................. 264/36

Primary Examiner—Howard N. Goldberg
Assistant Examiner—Irene G. Golabi
Attorney, Agent, or Firm—R. J. Austin

[57] ABSTRACT

A cable and cable pulling eye assembly prepared by heating the jacket at one cable end portion and radially compressing it to soften and redistribute the jacket material within the confines of a reduced outer diameter. A pulling eye which is too small to fit around the unreduced cable diameter is then fitted onto the reduced diameter end portion.

3 Claims, 5 Drawing Figures

METHOD OF DEFORMING A CABLE

In the installation of underground cables, it is necessary to pass the cables through existing ducts. For this purpose, a pulling eye is required for each cable, the eye being attached to an end portion of the cable to enable a tensile member such as a rope to be attached to the pulling eye to draw the cable through the ducts. Clearly, to enable the cables to be installed, it is essential to have sufficient clearance between the cable and its pulling eye and the inside surface of the duct. In one design of pulling eye, the eye has a sleeve which surrounds the cable jacket and is crimped onto it along the cable end portion. This enables the pulling force to be applied to the whole of the complete section of cable, i.e. the core, any shield or sheath, and the jacket itself. However, in some cases, the ducting is of insufficient size to enable the use of an eye with a surrounding sleeve as the sleeve necessarily increases the diameter of the cable and eye assembly and provides insufficient clearance between the eye and the inside of the duct. In one such case, it is well known to install a telecommunications cable having a core of 3,600 pairs of conductors inside a duct having an inside diameter of 3.50 inches. The diameter of the cable is 3.13 inches and therefore provides a minimum clearance between the cable and the inside surface of the duct of 0.25 inches. If a pulling eye having a surrounding sleeve is used upon this cable, then this pulling eye will have an outside diameter of 3.375 inches. This leaves insufficient clearance between the eye and the inner surface of the duct to enable the pulling eye to be moved through the duct. In such a situation, it is normal practice to remove the jacket and any sheath or shield of the cable along the end portion of the cable and to use a smaller diameter pulling eye which is secured directly to the cable core. While such a smaller diameter pulling eye will pass through the ducts to allow for installation of the cable, the pulling force upon the cable may only be taken upon the cable core itself and the pulling force which is applied cannot be as great as that which may be applied to a cable in which the pulling eye applies the pulling force to the core, the sheath or shield and to the jacket such as in the assemblies mentioned above.

The present invention provides a method of assembling a cable with a cable pulling eye which enables the cable to be drawn through a duct with a minimum clearance and without the need for removing any of the jacket material.

The method of the invention is concerned with reducing the outside diameter of the end portion of the cable by radially compressing the end portion and heating thermoplastic material in the cable outer jacket along the end portion to soften and redistribute the material within the confines of the reduced outer diameter.

As a result of the above method, a cable pulling eye of smaller diameter than would be required for the non-reduced diameter jacket, is located with a sleeve surrounding the reduced outside diameter end portion and the sleeve is secured to the end portion. Hence, the outside diameter of the sleeve may be within the confines of the normal diameter of the cable jacket or possibly of slightly greater diameter than the normal diameter of the cable jacket while still enabling the pulling eye to be drawn through a duct which could not accommodate a pulling eye of larger diameter and which would normally be assembled with its sleeve surrounding the non-reduced diameter jacket.

In a preferred method according to the invention, the end portion of the jacket is compressed while a portion of the jacket adjacent to the end portion is gripped and cooled to prevent the adjacent portion of the jacket from being softened by heat transferred from the end portion whereby a grip is maintained upon the cable to hold it in the mold during heating of the end portion.

The invention also includes apparatus for reducing the diameter of an end portion of an electrical cable preparatory to assembling a cable pulling eye onto the end portion, comprising a mold formed from mold bodies which, with the mold closed, define a mold cavity having a larger diameter cylindrical region and a smaller diameter cylindrical region interconnected with the larger diameter region and heating means to heat the smaller diameter cavity region.

The above apparatus preferably has some mold bodies which define the larger diameter region and other bodies which define the smaller diameter region, with the body parts defining the one region insulated from the body parts defining the other region, and with the body parts defining the larger diameter region having a cooling means which is operable during operation of the heating means.

The invention also includes an assembly of cable and cable pulling eye wherein the cable has an end portion with a jacket of diameter reduced below that of the remainder of the cable and the cable pulling eye has a sleeve surrounding and gripping onto the reduced diameter jacket of the end portion.

One embodiment of the invention will now be described by way of example, with reference to the accompanying drawings in which.

Figure 1:
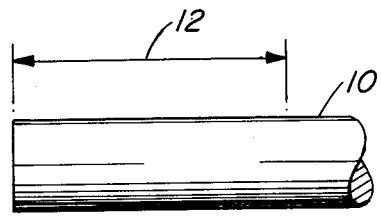
FIG. 1 is a side elevational view of an end region of a cable.

As shown by FIG. 1, a telecommunications cable having 3,600 pairs of individually insulated conductors has an outside diameter of 3.13 inches over the cable jacket 10.

To enable the cable to be installed underground by being pulled through an underground duct having an internal diameter of 3.50 inches, an end portion 12 of the jacket is to be reduced in diameter to enable a pulling eye 14 (FIG. 5) to be assembled onto the end portion while a surrounding sleeve 16 of the pulling eye is of substantially the same diameter as the cable jacket 10, whereby the clearance between the pulling eye and the duct is no less than between the cable and the duct. In fact, the outside diameter of the sleeve 16 of the pulling eye in its assembled condition is approximately 3.125 inches, which is substantially equal to that of the cable.

Figure 2:
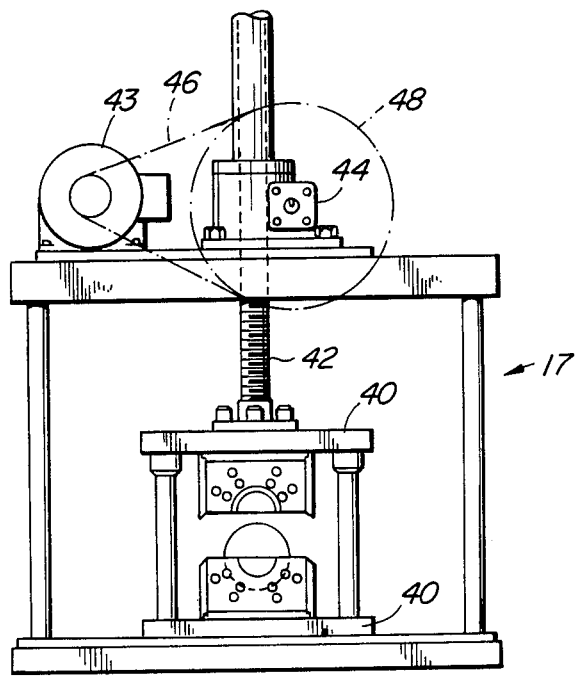
FIG. 2 is a side elevational view of apparatus for reducing the outside diameter of an end portion of the cable.
Figure 3:
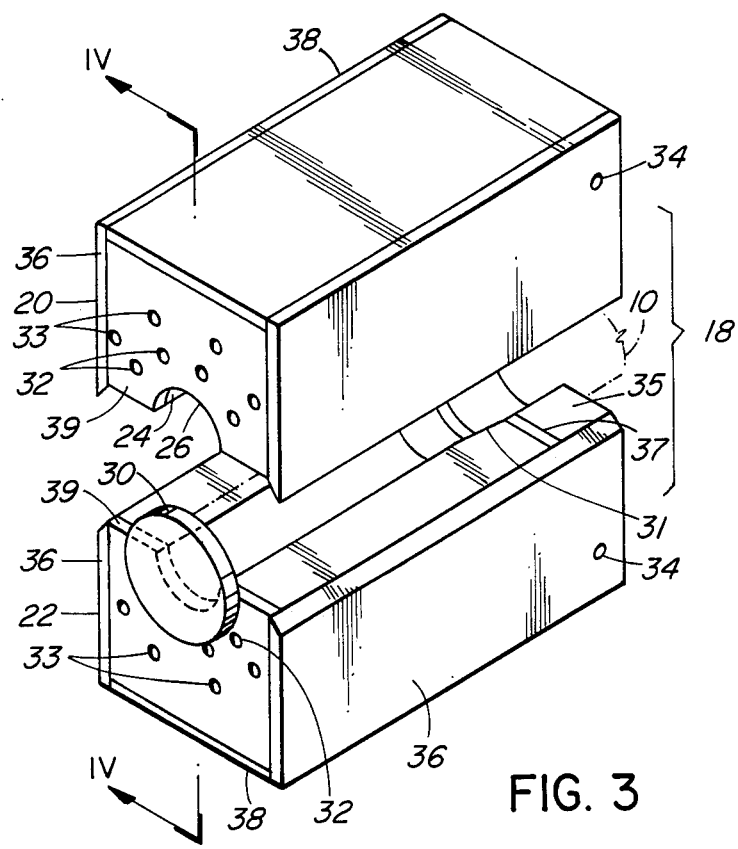
FIG. 3 is an isometric view of a mold forming part of the apparatus of FIG. 2.

The end portion 12 of the jacket is reduced in diameter by use of the apparatus 17 shown in FIGS. 2 and 3. The apparatus 17 includes a mold 18 comprising two mold halves 20 and 22 which are substantially identical. Each mold half has a main mold body 24 formed with a semi-cylindrical mold surface 26 along one of its sides. When the two mold halves are assembled, the surfaces 26 connect to form a cylindrical cavity 28 (FIG. 4) with a diameter of 2.90 inches. At one end of one mold body 24 (FIG. 3) there is provided an end plate 30 which projects above its mold surface 26 to form a blind end for the cavity 28 upon assembly of the mold halves. Electrical heating elements (not shown) are contained in passages 32 extending from one end of each mold body 24. Eight of these are provided, sufficient to heat the mold to a temperature of 325° F., for the purpose of softening the polyethylene which forms the jacket material of the cable and to enable it to flow within the mold. Four passages 33 are also provided from the one end of each mold body 24 for cooling fluid.

Figure 4:
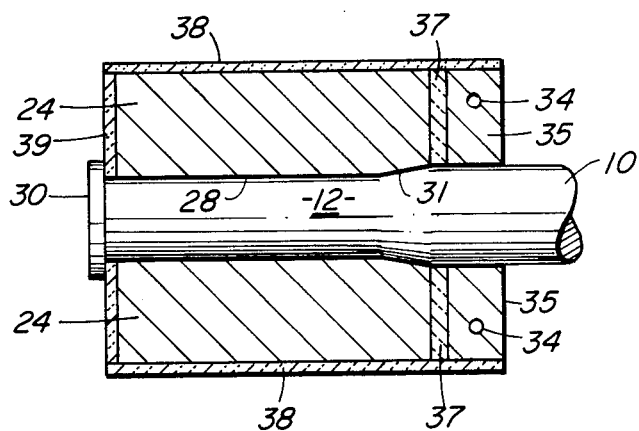
FIG. 4 is a cross-sectional view along line IV—IV in FIG. 3 showing the end portion of the cable being reduced in diameter.

At the end of the mold bodies 24 remote from the end plate 30, the two mold surfaces 26 are shaped to cause the sides of the cavity to diverge, as shown at 31 in FIGS. 3 and 4 so as to increase the diameter of the mold to that of the cable in its normal condition. At that end of the mold bodies, the increased diameter of the mold cavity is defined by two secondary mold bodies or end blocks 35 which are heat insulated from the mold bodies 24 by a layer 37 of asbestos, or layer of other insulating material, for instance that known as "Marinite" (trade mark) sold by Johns-Manville Canada Inc. The insulation layer has a thickness of around 0.5 inches. The blocks 35 are provided with cooling passages 34 which are connected to a source of cooling fluid. Each mold half 20 and 22 is completed by two insulating covering members 36, a top or bottom member 38 and end members 39 which cover the body 24, asbestos layer 37 and end blocks 35. The members 36, 38 and 39 are conveniently formed from the same insulating material as blocks 35.

As shown by FIG. 2, the apparatus 17 also includes two mold platens 40 between which the mold halves 20 and 22 are mounted, and associated equipment. The latter includes a screw drive 42 for raising and lowering the upper platen and an electric motor 43 operable at the required time to move the platen through the intermediary of a gear drive 44 by means of a belt pulley 46 and pulley wheel 48. The apparatus also includes a control for energizing the electrical heating elements and for providing cooling fluid in the cooling passages 33 and 34 precisely when required. The heating elements are operated alternately with passage of cooling fluid through passages 33, whereas cooling fluid is passed through passages 34 simultaneously with the operation of the heating elements.

In use of the apparatus, the end region of the cable is located between the two mold halves and these are brought together with the bodies heated by means of the heating elements. The mold halves thus compress the polyethylene material of the jacket and soften it so that the polyethylene is caused to be deformed inwardly into the cable whereby the end portion 12 is reduced in diameter as controlled by the mold surfaces 26. The jacket diameter increases progressively from the end portion 12 until it reaches the normal diameter of the cable, i.e. lying within the blocks 35. Cooling fluid passing through the passages 34 cool the blocks 35 sufficiently to prevent the surface of the jacket lying within the blocks from being heated to a softened condition under the influence of heat transfer from the end portion 12 of the cable lying within the mold bodies 24. Thus, the blocks 35 maintain a grip upon the jacket and serve to hold the end portion 12 between the mold bodies 24. Without the provision of the cooling means within the blocks 35, the jacket material lying radially within these plates would become sufficiently softened to allow the weight of cable outside the mold to pull the cable end from the mold as grip upon the cable end would become reduced significantly.

After allowing sufficient time for the displacement of the molten polyethylene within the mold to produce the desired reduced diameter, the heating elements within the passages 32 are de-energized and the polyethylene is allowed to solidify. Solidification is accelerated by pumping cooling fluid through the passages 33. The mold is then opened and the end portion of the cable is removed. Upon removal, it is found that the end region of the cable retains the shape to which it has been molded by the mold 18, i.e. with the end portion 12 now having a diameter of 2.90 inches.

It is then possible to place over the end portion 12 the pulling eye 14, the sleeve 16 of which would have a diameter too small to accommodate the end region 12 before its reduction in diameter.

Figure 5:
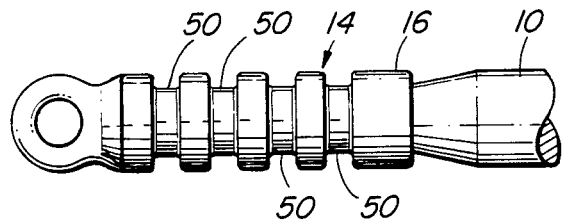
FIG. 5 is a side elevational view similar to FIG. 1 showing a cable pulling eye assembled onto the cable.

The sleeve 16 is hence received around the end portion 12, as shown in FIG. 5, and by normal procedures, is provided with annular crimps 50 to cause the sleeve to grip onto the end portion 12 and securely hold the pulling eye in position. The pulling eye is thus firmly secured to the cable without having removed any of the cable material. Thus a heavy pulling load may be applied to the eye and this pulling load is taken by the whole cable, including the jacket.

The pulling eye may be used to install the cable within a duct which has a minimum desired clearance with the cable. The duct has an internal diameter of 3.50 inches, which would be insufficient to allow for passage of a pulling eye 14 of the correct size for the uncompressed cable 10, i.e. a pulling eye having an outside diameter of 3.375 inches.

What is claimed is:

1. A method of preparing an electrical cable having a thermoplastic jacket material, said method being for the purpose of accepting a cable pulling eye and comprising reducing the outside diameter of an end portion of the cable by radially compressing the end portion simultaneously along the whole of its length while heating the jacket material along the whole end portion to soften and redistribute the material within the confines of the reduced outside diameter whereby the pulling eye with a sleeve which is too small in diameter to fit around the unreduced diameter cable, may have its sleeve disposed around the reduced diameter end portion.

2. A method of assembling a cable pulling eye onto an electrical cable having a thermoplastic jacket and in which the eye has a sleeve for surrounding the cable comprising reducing the outside diameter along an end portion of the cable by radially compressing the end portion simultaneously along the whole of its length while heating the thermoplastic jacket material of the whole end portion to soften and redistribute the material within the confines of the reduced outside diameter, locating the pulling eye with its sleeve surrounding the reduced outside diameter and portion, said sleeve being too small for location around the end portion before diameter reduction, and securing the sleeve to the end portion.

3. A method according to claim 1 comprising radially compressing the end portion within a mold while gripping a portion of the jacket adjacent to the end portion and cooling said adjacent portion to prevent the cable jacket at the adjacent portion from being portion to prevent the cable jacket at the adjacent portion from being softened by heat transferred from the end portion thereby to enable the grip to be maintained upon the adjacent portion and hold the cable in the mold during heating of the end portion.

* * * * *